United States Patent
Lee et al.

(10) Patent No.: US 10,105,896 B1
(45) Date of Patent: Oct. 23, 2018

(54) NOZZLE HEAD CLEANING MODULE

(71) Applicants: XYZPRINTING, INC., New Taipei (TW); KINPO ELECTRONICS, INC., New Taipei (TW)

(72) Inventors: Yang-Teh Lee, New Taipei (TW); Jia-Yi Juang, New Taipei (TW); Yi-Chu Hsieh, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/800,607

(22) Filed: Nov. 1, 2017

(30) Foreign Application Priority Data

Apr. 21, 2017 (TW) .............................. 106113535 A
Aug. 17, 2017 (TW) .............................. 106127991 A

(51) Int. Cl.
*B29C 64/35* (2017.01)
*B08B 1/00* (2006.01)
*B33Y 40/00* (2015.01)

(52) U.S. Cl.
CPC .............. *B29C 64/35* (2017.08); *B08B 1/005* (2013.01); *B33Y 40/00* (2014.12)

(58) Field of Classification Search
CPC ....... B29C 64/35; B41J 2/165; B41J 2/16505; B41J 2/16517; B41J 2/16511; B41J 2/16588; B41J 29/17
See application file for complete search history.

(56) References Cited

U.S. PATENT DOCUMENTS

| | | | |
|---|---|---|---|
| 6,168,257 B1 * | 1/2001 | Aldrich | B41J 2/16547 347/32 |
| 2009/0273630 A1 * | 11/2009 | Pan | B41J 2/16538 347/33 |
| 2018/0236773 A1 * | 8/2018 | Hirata | B41J 2/16544 |

* cited by examiner

*Primary Examiner* — Geoffrey S Mruk
*Assistant Examiner* — Scott A Richmond
(74) *Attorney, Agent, or Firm* — Chun-Ming Shih; HDLS IPR Services

(57) ABSTRACT

A nozzle head cleaning module including a base housing having a main slope; a main carrier received in the base housing, a sub-carrier received in the main carrier and has a cover protruding upwardly, and an interference structure is provided. A set of one or more horizontal planes is formed on the main slope. A set of one or more main slide pins contacting with the main slope protrudes from the main carrier including a sub-slope, and the main carrier is moved along the main slope. When resting on the main slope, the main slide pin contacts with the main slope by multiple contact points. When resting on the horizontal plane, the main slide pin contacts with the horizontal plane by multiple contact points. The horizontal plane support main slide pin to maintain the cover in a raised position when the main slide pin is located thereon.

13 Claims, 10 Drawing Sheets

NOZZLE HEAD CLEANING MODULE

BACKGROUND OF THE INVENTION

Field of the Invention

The technical field relates to a nozzle head cleaning module for a heat-melting type three-dimensional printer and, in particular, to a hidden type nozzle head cleaning module.

Description of Related Art

Usually, a three-dimensional (3D) printer with a coloring function has a formation nozzle head for extruding a melted material and also has a coloring nozzle head for coloring. Therefore, the 3D printer is provided with a cleaning module for cleaning the coloring nozzle head and a cover set module which is used to cover the coloring nozzle head to prevent ink from drying out when the 3D printer is not in use. Normally, the cleaning module includes a scraper protruding out of a formation plane, and the coloring nozzle head moves to the scraper to rub against the scraper for cleaning. The cover set module can ascend or descend, and at least a portion of the cover set module protrudes out of the formation plane, so that the coloring nozzle head can push to raise a cover of the cover set module.

At least the above-mentioned components are protrudingly disposed on the formation plane. During a printing process, the formation nozzle head or the coloring nozzle head should not interfere with the above-mentioned protruding components. When the formation nozzle head moves to an edge of the formation plane, the coloring nozzle head may exceed an area of the formation plane to interfere with the above-mentioned protruding components. Therefore, the formation nozzle head in particular movement courses is not allowed to move to the edge of the formation plane, and consequently, a portion of the area of the formation plane cannot be used for printing a product, and thereby a size of the finished product is limited.

The scraper and the cover are not associated. Therefore, to receive the scraper and the cover below the formation plane, two sets of a motor and gears are required for driving the scraper and the cover, respectively, which leads to a larger overall size and higher production costs.

In views of this, in order to solve the above disadvantage, the inventor studied related technology and provided a reasonable and effective solution in the present disclosure.

SUMMARY OF THE INVENTION

The disclosure is directed to a hidden-type nozzle head cleaning module.

One of the exemplary embodiments, the disclosure is directed to a nozzle head cleaning module, including a base housing, a main carrier, a sub-carrier and an interference structure. The base housing includes a main slope, and a set of horizontal planes is formed on the main slope. The main carrier is received in the base housing, a scraper protrudes upwardly from the main carrier, a set of main slide pins in contact with the main slope protrudes from the main carrier, the main carrier includes a sub-slope, the main carrier is lifted or lowered obliquely along the main slope with respect to the base housing so as to lift or lower the scraper. When disposed on the horizontal planes, the main slide pin is in contact with the horizontal plane by multiple contact points. The sub-carrier is accommodated in the main carrier, the movement of the main carrier moves the sub-carrier at the same time, a cover protruding upwardly is arranged on the sub-carrier, and at least a portion of the sub-carrier is in contact with the sub-slope. The interference structure is arranged corresponding to the sub-carrier. When the interference structure is in contact with the sub-carrier while the sub-carrier is moving, the interference structure pushes the sub-carrier to move along the sub-slope with respect to the main carrier, and the cover thereby ascends. When the main slide pins is moved to the horizontal planes, the horizontal planes support the main slide pins to maintain the cover in a raised position.

In the nozzle head cleaning module according to the present disclosure, the interference structure is disposed inside the base housing.

In the nozzle head cleaning module according to the present disclosure, the driving assembly is connected to the main carrier to move it. The driving assembly includes a motor and a gear set, and the gear set is operatively associated with the motor and the main carrier. The main carrier includes a rack, and the rack meshes with the gear set. The rack is parallel to the main slope.

In the nozzle head cleaning module according to the present disclosure, the main slope and the sub-slope are inclined in opposite directions; an upper end of the main slope is arranged corresponding to the interference assembly. A sub-slide pin in contact with the sub-slope protrudes from the sub-carrier. The scraper is ascendable to protrude out of a top surface of the base housing.

The nozzle head cleaning module according to the present disclosure includes a plurality of cylindrical main slide pins and a plurality of horizontal planes corresponding to the main slide pins respectively. When the main slide pins are disposed on the main slope, the main slide pins are in contact with the main slope. When the main slide pins are disposed on the horizontal planes, the main slide pins are in contact with the horizontal planes respectively.

The nozzle head cleaning module according to the present disclosure includes a single main slide pin which is a diamond-shaped pillar, and a single horizontal plane corresponding to the main slide pin. The main slide pin includes a first support plane and a second support plane inclined to each other. When the main slide pin is disposed on the main slope, the first support plane is in contact with the main slope. When main slide pin is disposed on the horizontal plane, the second support plane is in contact with the horizontal plane.

In the nozzle head cleaning module according to the present disclosure, the main carrier moves obliquely, and the movement direction is changed by means of the sub-slope and the interference structure. Therefore, by moving the main carrier solely, the scraper and the cover can ascend or descend vertically. When the main carrier moves to the end of the movement course, the horizontal plane of the main slope of the base housing can support the main carrier, so that the main carrier does not slip down when it stops.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION OF THE INVENTION

Figure 1:
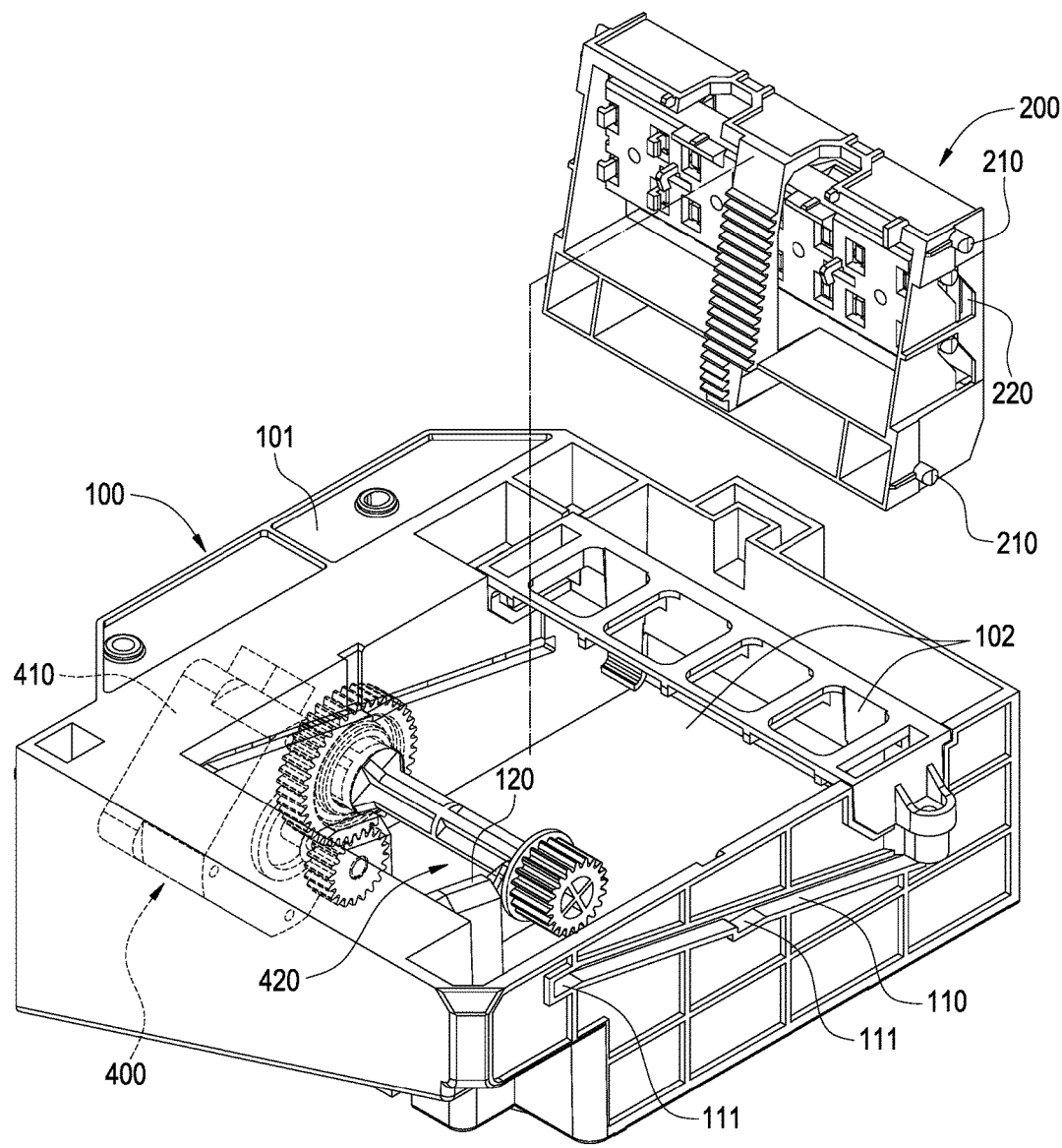
FIGS. 1 and 2 are perspective exploded views illustrating a nozzle head cleaning module according to one embodiment of the present disclosure.
Figure 2:
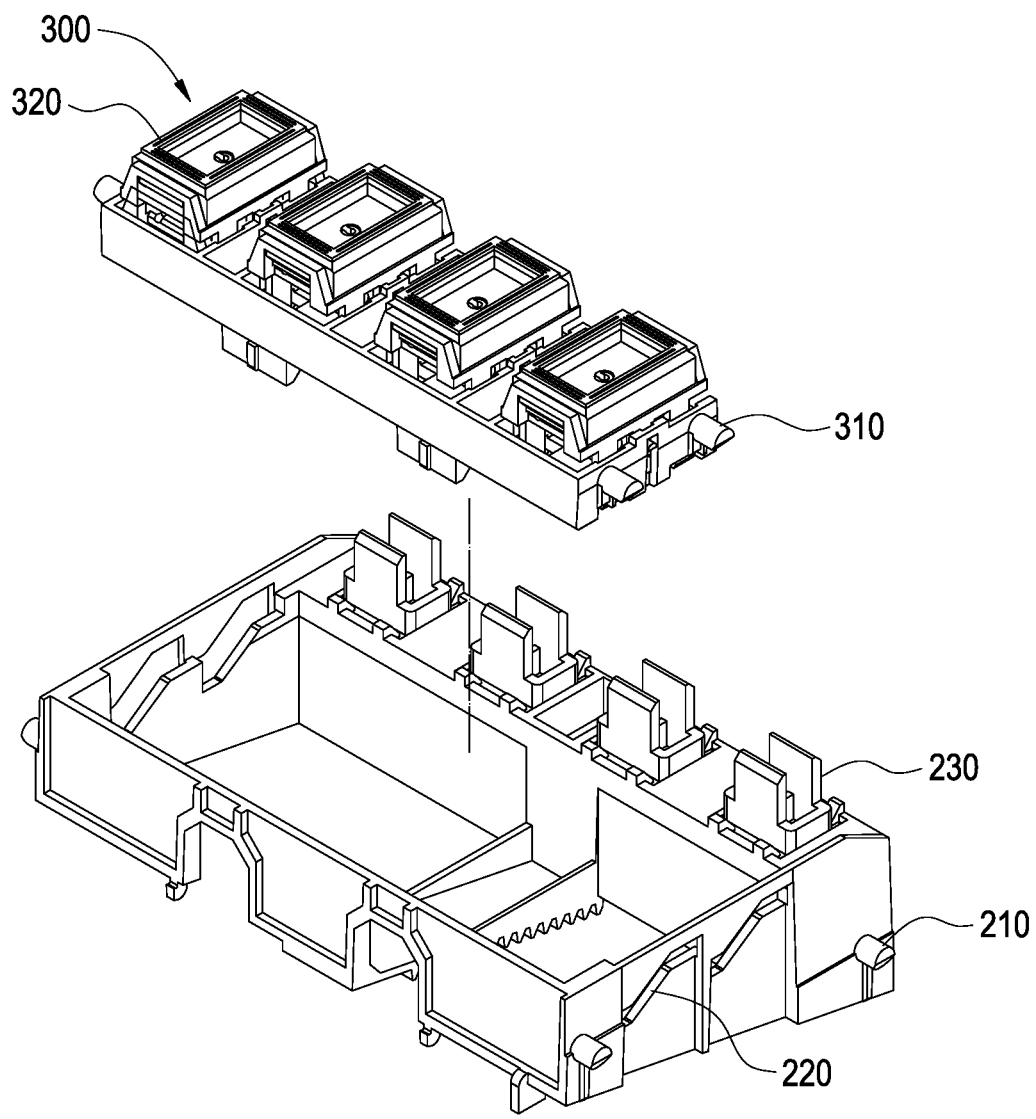

Please refer to FIGS. 1 to 4 showing a nozzle head cleaning module according to one embodiment of the present disclosure. The nozzle head cleaning module is used in a heat-melting type three dimensional (3D) printer (not illustrated) and is disposed corresponding to a formation plane 10 of the 3D printer. The nozzle head cleaning module includes a base housing 100, a main carrier 200, a sub-carrier 300, a driving assembly 400, and an interference structure 120.

In the present embodiment, the base housing 100 is a hollow casing however, the present disclosure is not limited to any particular material of the base housing 100. The base housing 100 is fixed to the 3D printer and is disposed at one side of the formation plane 10. A top surface 101 of the base housing 100 includes at least one opening 102. The top surface 101 of the base housing 100 is not higher than a level of the formation plane 10. The top surface 101 of the base housing 100 is preferably flush with the formation plane 10, but alternatively the top surface 101 of the base housing 100 can be lower than the formation plane 10. At least one main slope 110 is disposed inside the base housing 100. In the present embodiment, the base housing 100 includes two main slopes 110 with the same structure and functions, a portion of each main slope 110 includes a set of one or more horizontal planes 111, and the set of one or more horizontal planes 111 includes a single or multiple horizontal planes 111 (in the present embodiment, there are two horizontal planes 111); however, only one main slope 110 is described hereinafter for simplicity of description.

The main carrier 200 is received in the base housing 100, a scraper 230 protrudes upwardly from the main carrier 200, and the main carrier 200 includes at least one sub-slope 220. In the present embodiment, the main carrier 200 includes multiple same sub-slopes 220. The main slopes 110 and the sub-slopes 220 are inclined in opposite directions. A rack 201 is obliquely disposed on an outer bottom side of the main carrier 200, and the rack 201 is parallel to the main slope 110. At least one set of main slide pins 210 protrudes from an outer side surface of the main carrier 200. In the present embodiment, there are two sets of one or more main slide pins 210 with the same structure and functions, corresponding to the respective two main slopes 110, protrude from respective outer side surfaces of the main carrier 200. The two sets of one or more main slide pins 210 are respectively in contact with the two main slopes 110, and each set of one or more main slide pins 210 includes a single or multiple main slide pins 210 (there are two main slide pins 210 in this embodiment), the number of the main slide pins 210 corresponds in number to the number of the horizontal planes 111, and each main slide pin 210 collaborates with each horizontal plane 111; however, only one set of one or more main slide pin 210 is described hereinafter for simplicity of description. When disposed on the main slope 110, the set of one or more main slide pins 210 contacts, along a longitudinal direction of the main slope 110, the main slope 110 by multiple contact points. By supporting multiple main slide pins 210 on the main slope 110, the main carrier 200 is prevented from rotation and maintains the same posture while moving along the main slope 110. When the set of one or more main slide pins 210 is disposed on the set of one or more horizontal plane 111, the set of one or more main slide pins 210 is in contact with the set of one or more horizontal planes 111 by multiple contact points. By supporting the main slide pins 210 on the horizontal plane 111, the main carrier 200 is prevented from rotation and maintains the same posture after moving to the horizontal plane 111. The main carrier 200 is lifted or lowered obliquely along the main slope 110 with respect to the base housing 100 so as to lift or lower the scraper 230. In detail, in the present embodiment, when the set of one or more main slide pins 210 rests on the main slope 110, each main slide pin 210 contacts the main slope 110. When the main slide pin 210 rests on the horizontal plane 111, each main slide pin 210 contacts a respective corresponding one of the horizontal planes 110.

The sub-carrier 300 is accommodated in the main carrier 200, a cover 320 protruding upwardly is arranged on the sub-carrier 300, and at least a portion of the sub-carrier 300 is in contact with the sub-slope 220. At least one sub-slide pin 310 protrudes from an outer side surface of the sub-carrier 300. In the present embodiment, there are multiple sub-slide pins 310 with the same structure and functions, the multiple sub-slide pins 310 protruding from outer side surfaces of the sub-carrier 300 are disposed respectively corresponding to the above-mentioned sub-slopes 220. Each sub-slide pin 310 is in contact with a respective corresponding one of the sub-slopes 220; however, only one sub-slide pin 310 is described hereinafter for simplicity of description.

The driving assembly 400 is connected to the main carrier 200 and obliquely lifts or lowers the main carrier 200 with respect to the base housing 100 to lift or lower the scraper 230, and the scraper 230 is lifted to protrude out of a top surface 101 of the base housing 100 through the opening 102. In the present embodiment, the driving assembly 400 includes a motor 410 and a gear set 420, the motor 410 is fixed to the base housing 100, and the gear set 420 is operatively associated with the motor 410 and the main carrier 200. In detail, the gear set 420 is connected to the motor 410 and meshes with the rack 201 of the main carrier 200, so the motor 410 can drive the main carrier 200 to ascend or descend along the main slope 110. The movement of the main carrier 200 moves the sub-carrier 300 accommodated inside the main carrier 200 at the same time.

The interference structure 120 is arranged inside the base housing 100 corresponding to the sub-carrier 300. In the present embodiment, the interference structure 120 is a protruding block inside the base housing 100. A top end of the main slope 110 is arranged corresponding to the interference structure 120. When the interference structure 120 is in contact with the sub-carrier 300 while the sub-carrier 300 is moving, the interference structure 120 blocks the sub-carrier 300 and maintains a horizontal position of the sub-carrier 300. Once the main carrier 200 continues to move toward the interference structure 120, the interference structure 120 pushes the sub-carrier 300 to move along the sub-slope 220 with respect to the main carrier 200, and the cover 320 thereby ascends. The cover 320 ascends to pass through the opening 102 to protrude out of the top surface 101 of the base casing 100.

Figure 3:
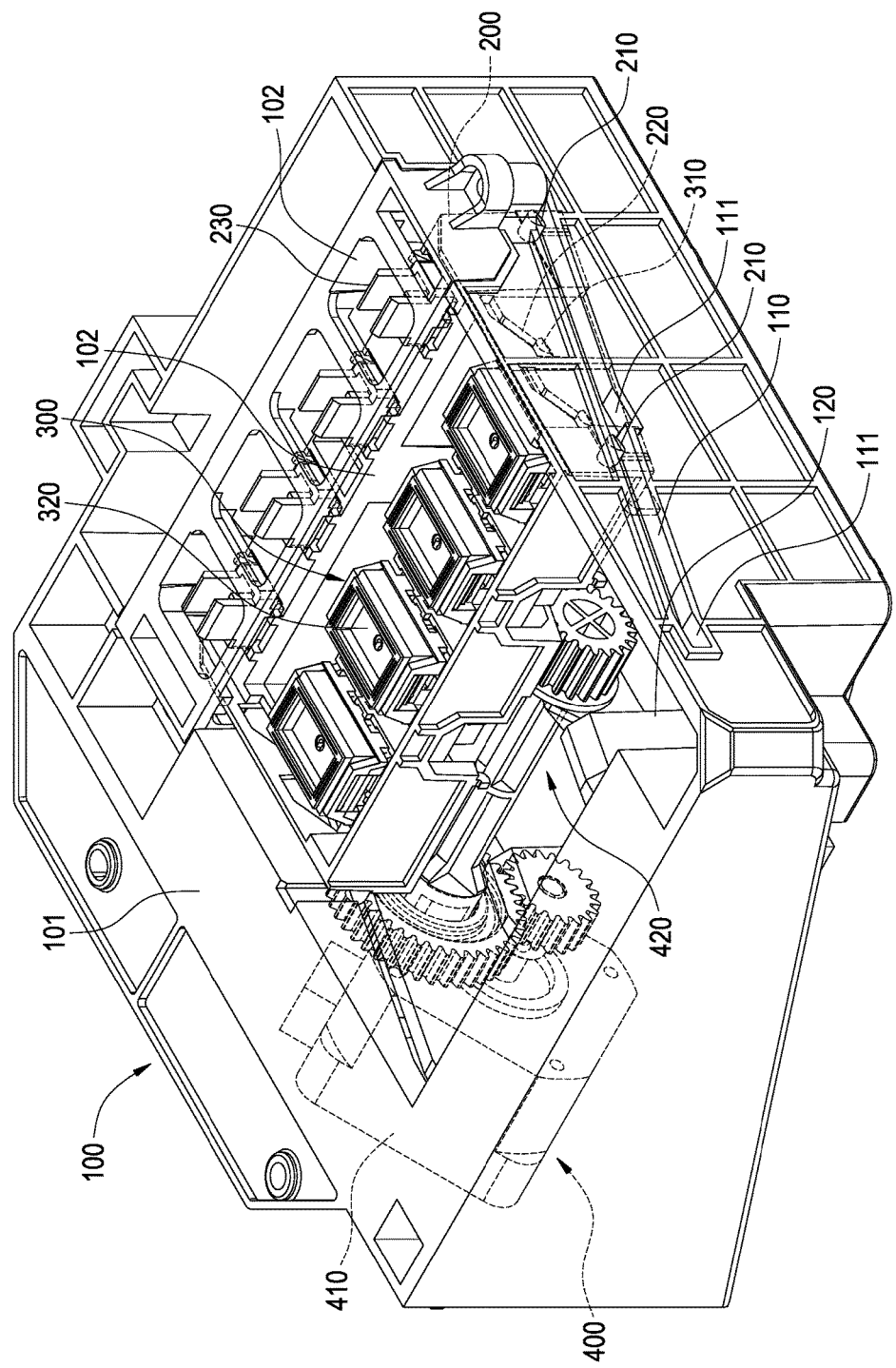
FIG. 3 is a perspective view illustrating the nozzle head cleaning module according to one embodiment of the present disclosure.
Figure 4:
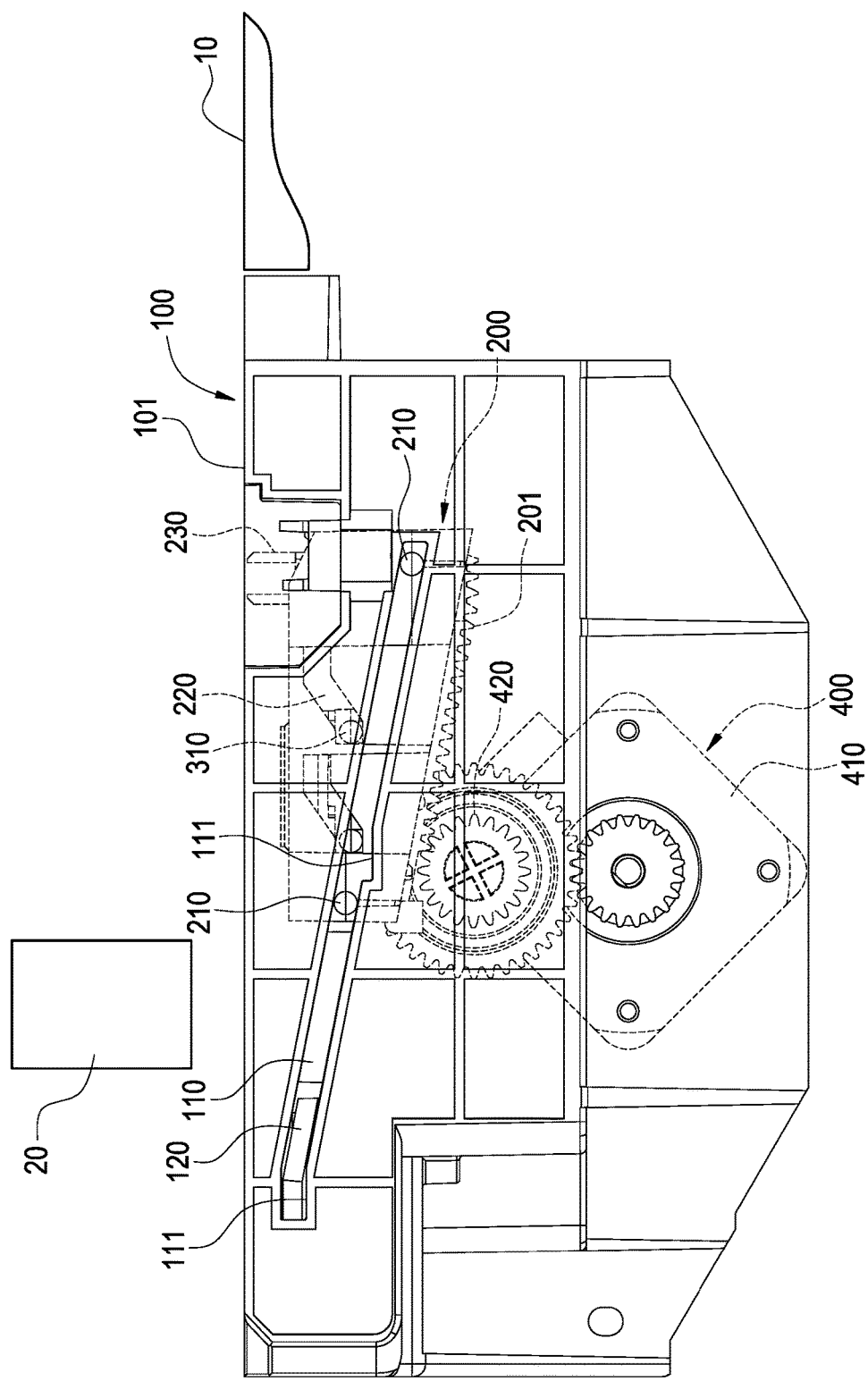
FIGS. 4 to 8 are schematic views illustrating motions of the nozzle head cleaning module according to one embodiment of the present disclosure.
Figure 5:
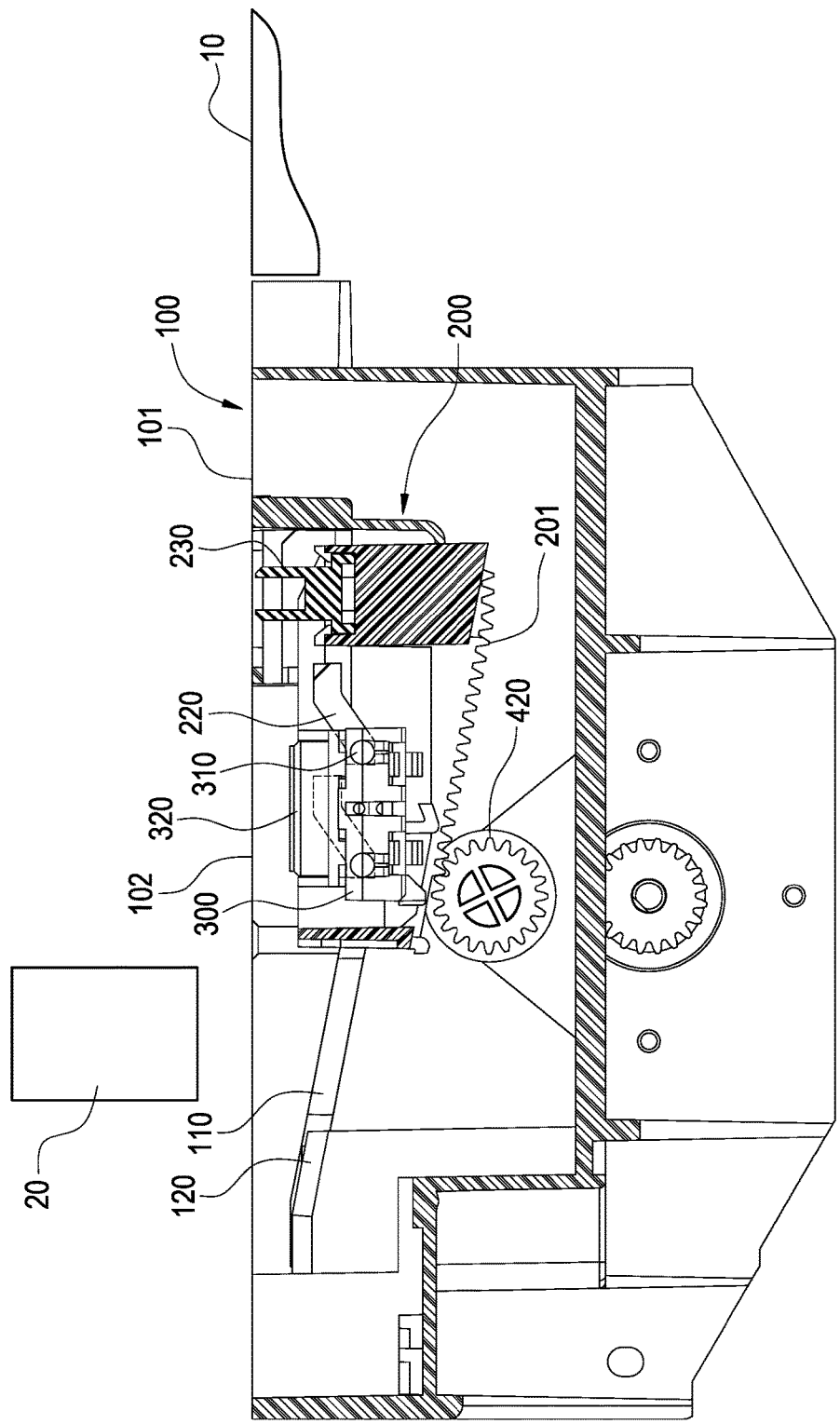

Referring to FIGS. 3 to 5, in the present embodiment, the top surface 101 of the base housing 100 is flush with the formation plane 10. When the 3D printer is in operation, the main carrier 200 is at a lower end of the main slope 110, and the scraper 230 is received in the base housing 100 and is disposed below the top surface 101 of the base housing 100. In addition to that, the sub-carrier 300 is at a lower end of the sub-slope 220, and the cover 320 is received in the main carrier 200 and is disposed below the top surface 101 of the base housing 100. Therefore, during printing operation, a coloring head 20 is allowed to move beyond the formation plane 10, so there is more room available for use on the formation plane 10.

To clean the coloring head 20, the main carrier 200 is driven by the motor 410 to ascend along the main slope 110 toward the interference structure 120, so that the scraper 230 protrudes out of the top surface 101 of the base housing 100. At this point, the sub-carrier 300 does not yet touch the interference structure 120, and the cover 320 is still received inside the main carrier 200 and is disposed below the top surface 101 of the base housing 100. Then, the coloring head 20 is moved to contact the scraper 230, and the coloring head 20 is moved back and forth for cleaning.

Figure 6:
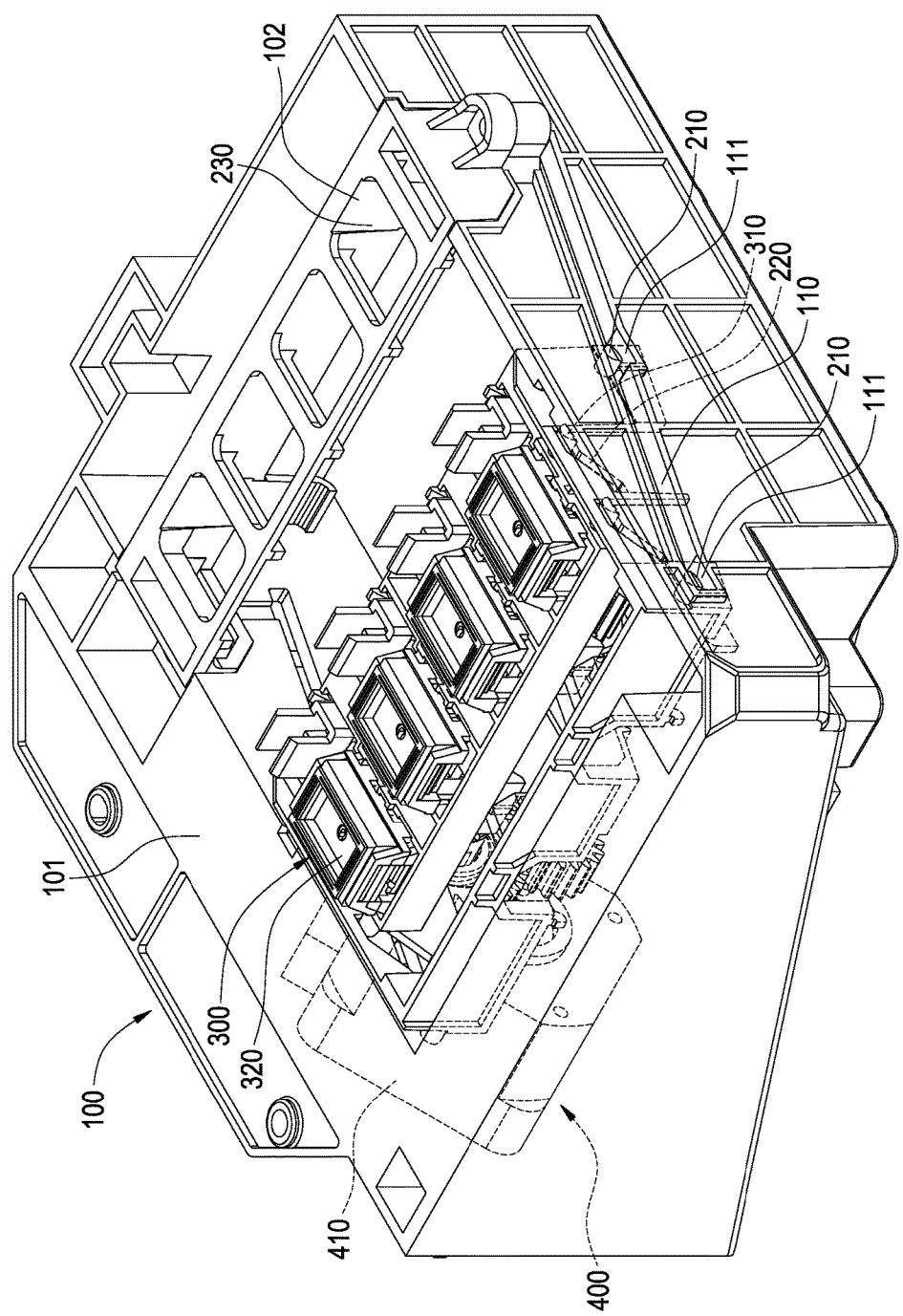
Figure 7:
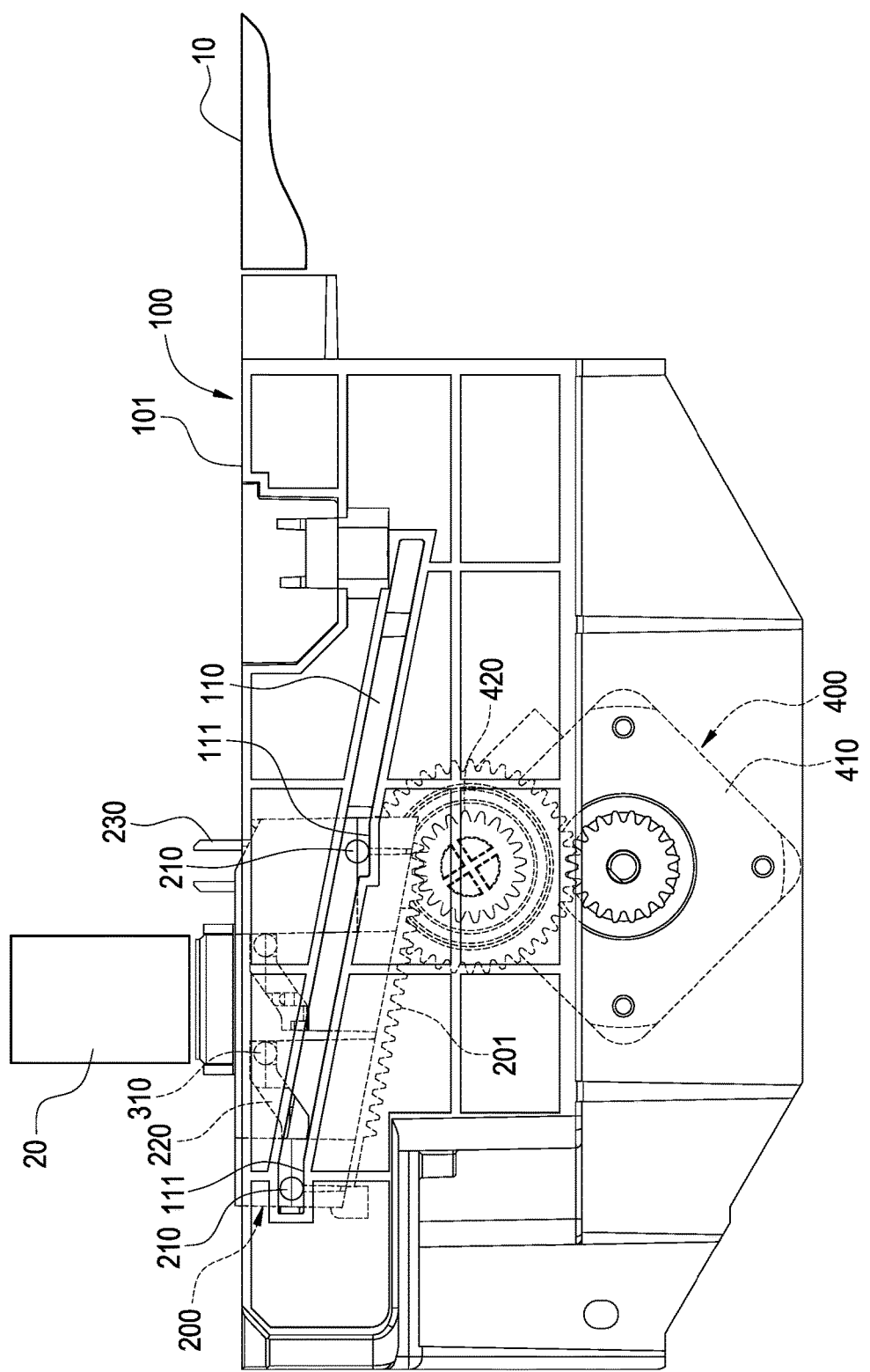
Figure 8:
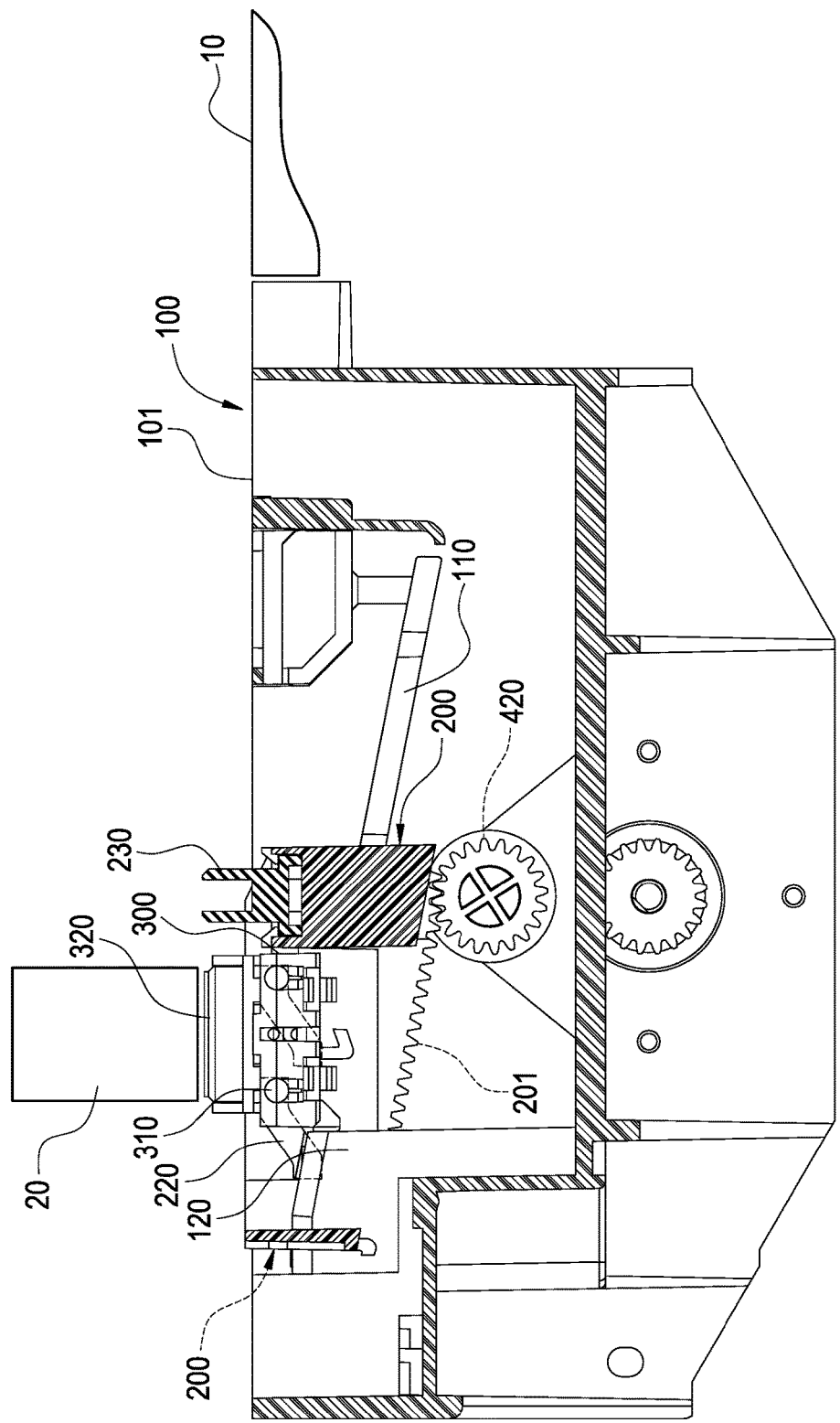

Referring to FIGS. 6 to 8, after cleaning, the coloring head 20 is moved to a standby position, the standby position is arranged corresponding to a position of the interference structure 120. The motor 410 continues to drive the main carrier 200 to move toward the interference structure 120 along the main slope 110. When the sub-carrier 300 touches the interference structure 120, the sub-carrier 300 is blocked from moving horizontally by the interference structure 120, and the cover 320 is at a standby position. The motor 410 continues driving the main carrier 200 to move toward the interference structure 120 along the main slope 110, and the sub-carrier 300 is pushed by the interference structure 120 to an upper end of the sub-slope 220 to vertically raise the cover 320 to cover the coloring head 20. When the set of one or more main slide pins 210 moves to the set of one or more horizontal planes 111, the set of one or more horizontal planes 111 support the set of one or more main slide pins 210 to maintain the cover 230 in a raised position.

In the nozzle head cleaning module according to the present disclosure, the main carrier 200 is driven by the motor 410 to move obliquely. The oblique movement achieves horizontal displacement and vertical displacement. Due to the vertical displacement, the scraper 230 ascends or descends vertically. By means of the interference structure 120 and the sub-slope 220, the horizontal displacement of the main carrier 200 is changed to vertical displacement to achieve vertical ascending/descending of the cover 320. Therefore, in the nozzle head cleaning module of the present disclosure, only one motor 410 is required to drive the scraper 230 and the cover 320 to ascend or descend vertically. Moreover, when the main carrier 200 moves to the end of the movement course, the horizontal plane 111 of the main slope 110 of the base housing 100 can support the main carrier 200, so that the main carrier 200 does not slip down when it stops.

Figure 9:
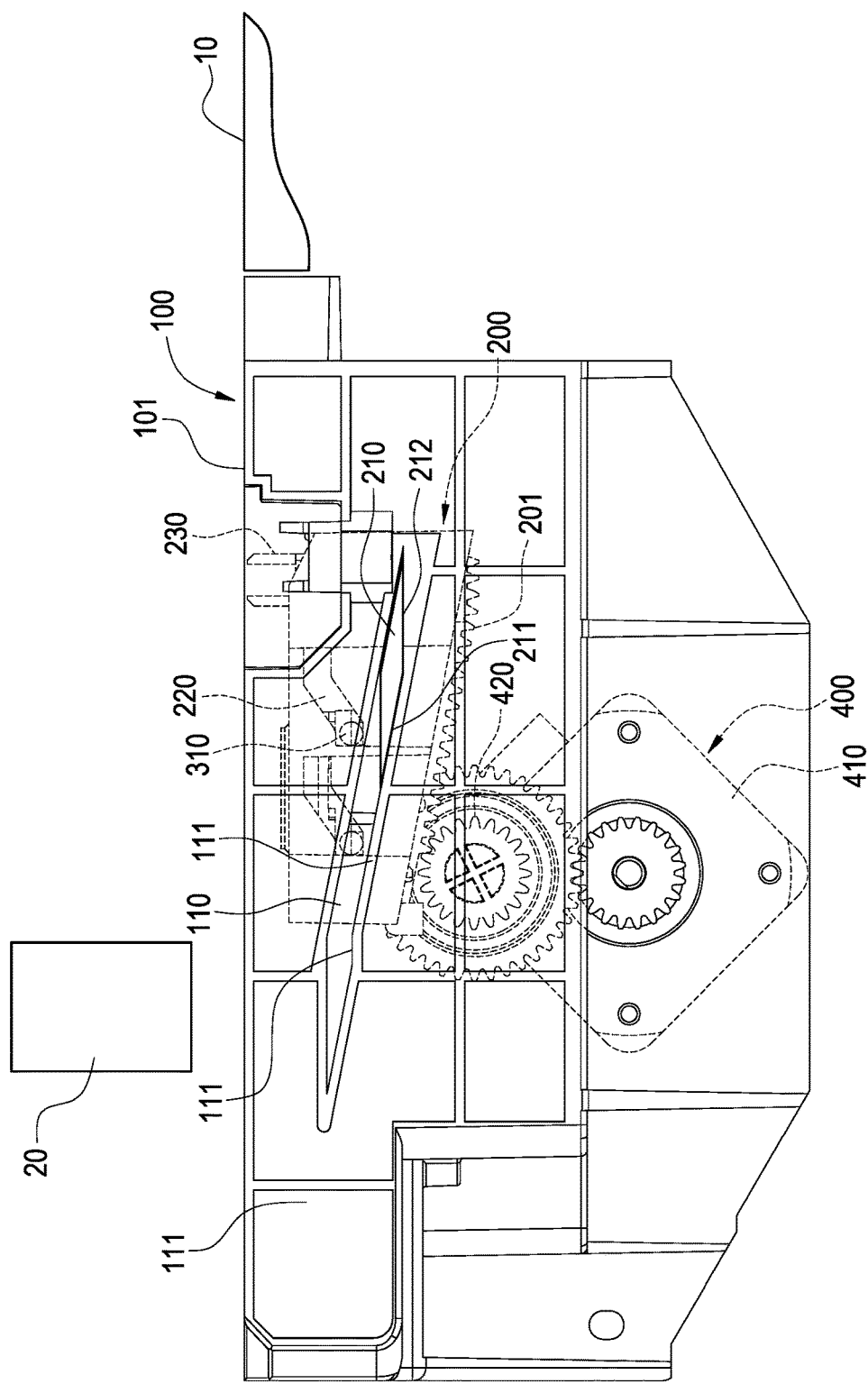
FIGS. 9 and 10 are schematic views illustrating motions of the nozzle head cleaning module according to another embodiment of the present disclosure.
Figure 10:
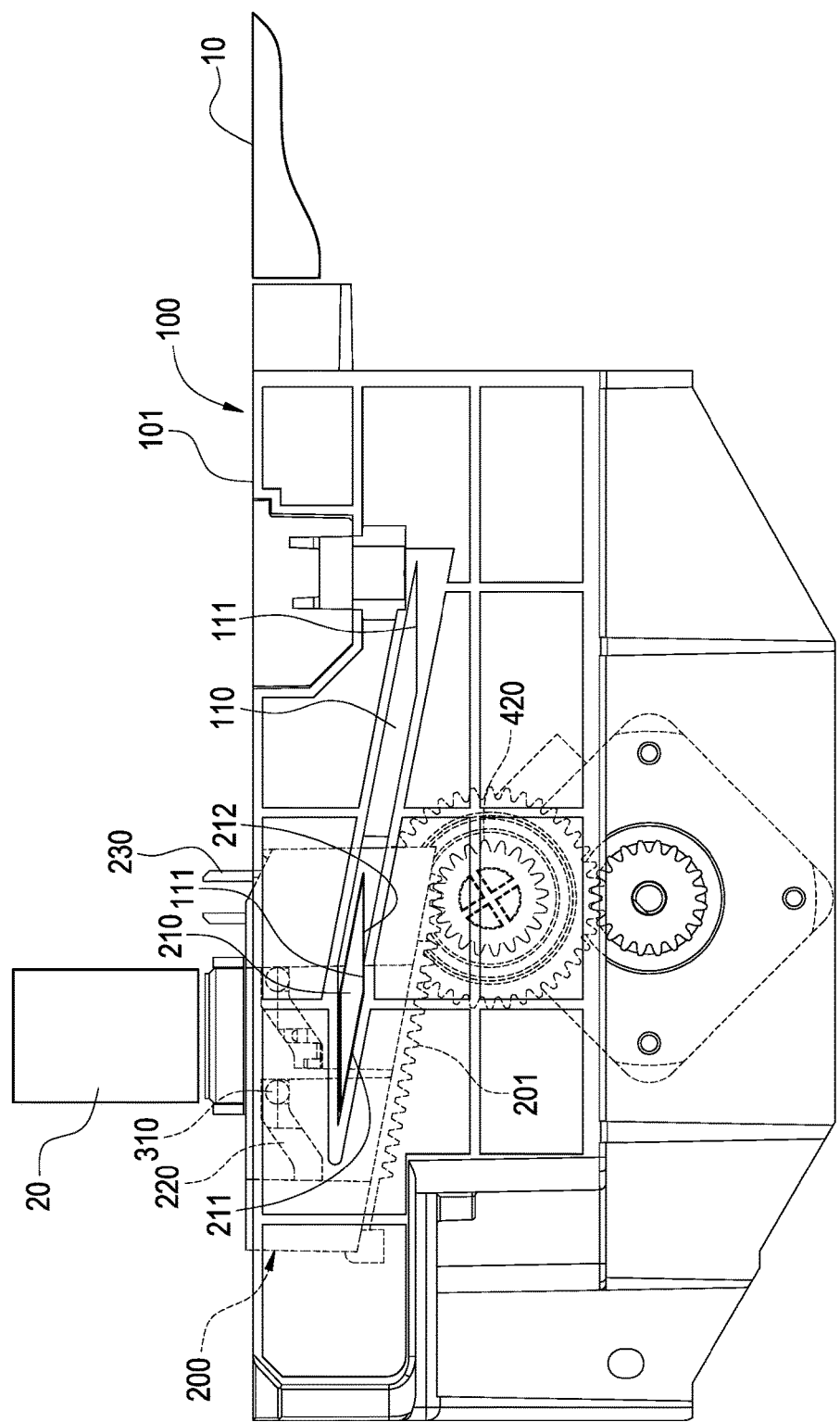

Referring to FIGS. 9 and 10 illustrating the main slide pin according to another embodiment of the present disclosure, the set of one or more main slide pins 210 includes a single main slide pin 210 which is a diamond-shaped pillar, and the main slide pin 210 includes a first support plane 211 and a second support plane 212 inclined to each other. An included angle included by the first support plane 211 and the second support plane 212 is equal to an included angle included by the main slope 110 and the horizontal plane 111. A single horizontal plane 111 is formed on an upper end of the main slope 110 and is arranged corresponding to the single main slide pin 210. When the main slide pin 210 is disposed on the main slope 110, the first support plane 211 is in contact with the main slope 110. By resting the first support plane 211 on the main slope 110, the main carrier 200 is prevented from rotation and maintains the same posture while moving along the main slope 110. When the main slide pin 210 rests on the horizontal plane 111, the second support plane 212 is in contact with the horizontal plane 111. By supporting the second support plane 212 on the horizontal plane 111, the main carrier 200 is prevented from rotation and maintains the same posture after moving to the horizontal plane 111.

It is to be understood that the above descriptions are merely the preferable embodiments of the present disclosure and are not intended to limit the scope of the present disclosure. Equivalent changes and modifications made in the spirit of the present disclosure are regarded as falling within the scope of the present invention.

What is claimed is:

1. A nozzle head cleaning module, comprising:
a base housing including a main slope, a set of one or more horizontal planes being formed on a portion of the main slope;
a main carrier received in the base housing, a scraper protruding upwardly from the main carrier, a set of one or more main slide pins in contact with the main slope protruding from the main carrier, the main carrier including a sub-slope, the main carrier being lifted or lowered obliquely along the main slope with respect to the base housing so as to lift or lower the scraper, wherein when disposed on the main slope, the set of one or more main slide pins is in contact with the main slope along a longitudinal direction of the main slope by multiple contact points; and when disposed on the set of one or more horizontal planes, the set of one or more main slide pins is in contact with the set of one or more horizontal planes by multiple contact points;
a sub-carrier, the sub-carrier being accommodated in the main carrier, the movement of the main carrier moving the sub-carrier at the same time, a cover protruding upwardly being arranged on the sub-carrier, at least a portion of the sub-carrier being in contact with the sub-slope; and
an interference structure arranged corresponding to the sub-carrier, wherein when the interference structure is in contact with the sub-carrier while the sub-carrier is moving, the interference structure pushes the sub-carrier to move along the sub-slope with respect to the main carrier, and the cover thereby ascends; and when the set of one or more main slide pins is moved onto the set of one or more horizontal planes, the set of one or more horizontal planes support the set of one or more main slide pins to maintain the cover in a raised position.

2. The nozzle head cleaning module according to claim 1, wherein the interference structure is disposed inside the base housing.

3. The nozzle head cleaning module according to claim 1, further comprising a driving assembly, the driving assembly being connected to the main carrier to move the main carrier.

4. The nozzle head cleaning module according to claim 3, wherein the driving assembly includes a motor and a gear set, and the gear set is operatively associated with the motor and the main carrier.

5. The nozzle head cleaning module according to claim 4, wherein the main carrier includes a rack, and the rack meshes with the gear set.

6. The nozzle head cleaning module according to claim 5, wherein the rack is parallel to the main slope.

7. The nozzle head cleaning module according to claim 1, wherein the main slope and the sub-slope are inclined in opposite directions.

8. The nozzle head cleaning module according to claim 1, wherein an upper end of the main slope is arranged corresponding to the interference assembly.

9. The nozzle head cleaning module according to claim 1, wherein a sub-slide pin in contact with the sub-slope protrudes from the sub-carrier.

10. The nozzle head cleaning module according to claim 1, the scraper is ascendable to protrude out of a top surface of the base housing.

11. The nozzle head cleaning module according to claim 1, the cover is ascendable to protrude out of a top surface of the base housing.

12. The nozzle head cleaning module according to claim 1, wherein the set of one or more main slide pins includes multiple cylindrical main slide pins, the set of one or more horizontal planes includes multiple horizontal planes corresponding to the main slide pins respectively; when the set of main slide pins is disposed on the main slope, each of the main slide pins is in contact with the main slope; and when the set of one or more main slide pins is disposed on the horizontal planes, the main slide pins are in contact with the horizontal planes respectively.

13. The nozzle head cleaning module according to claim 1, wherein the set of one or more main slide pins includes a single main slide pin which is a diamond-shaped pillar, and the main slide pin includes a first support plane and a second support plane inclined to each other, the set of one or more horizontal planes includes a single horizontal plane corresponding to the main slide pin; when the main slide pin is disposed on the main slope, the first support plane is in contact with the main slope; and when the set of one or more main slide pins is disposed on the horizontal plane, the second support plane is in contact with the horizontal plane.

* * * * *